United States Patent
Bidare

(10) Patent No.: US 9,306,905 B2
(45) Date of Patent: Apr. 5, 2016

(54) SECURE ACCESS TO APPLICATION SERVERS USING OUT-OF-BAND COMMUNICATION

(71) Applicant: Tata Consultancy Services Ltd., Mumbai, Maharashtra (IN)

(72) Inventor: Prasanna Bidare, Karnataka (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 0 days.

(21) Appl. No.: 13/716,114

(22) Filed: Dec. 15, 2012

(65) Prior Publication Data

US 2013/0179954 A1    Jul. 11, 2013

(30) Foreign Application Priority Data

Dec. 20, 2011   (IN) .......................... 3575/MUM/2011

(51) Int. Cl.
*H04L 9/32*      (2006.01)
*H04L 29/06*     (2006.01)

(52) U.S. Cl.
CPC ................ *H04L 63/00* (2013.01); *H04L 63/08* (2013.01); *H04L 63/18* (2013.01); *H04L 2463/102* (2013.01)

(58) Field of Classification Search
CPC ... H04L 63/18; H04L 2463/102; H04L 63/08; H04L 63/00
USPC .......................................................... 726/7
See application file for complete search history.

(56) References Cited

U.S. PATENT DOCUMENTS

| | | | |
|---|---|---|---|
| 6,944,765 B1* | 9/2005 | Rose et al. .................... 713/181 |
| 2003/0163739 A1* | 8/2003 | Armington et al. ........... 713/202 |
| 2007/0113294 A1* | 5/2007 | Field et al. ....................... 726/27 |
| 2007/0226350 A1 | 9/2007 | Sanda |
| 2007/0288392 A1 | 12/2007 | Peng |
| 2008/0077791 A1* | 3/2008 | Lund et al. .................... 713/156 |
| 2009/0063850 A1* | 3/2009 | Joram et al. .................. 713/155 |
| 2009/0172402 A1 | 7/2009 | Tran |
| 2009/0265776 A1* | 10/2009 | Baentsch et al. ................. 726/9 |
| 2009/0300745 A1* | 12/2009 | Dispensa .......................... 726/7 |
| 2010/0333186 A1* | 12/2010 | Chan et al. ...................... 726/10 |
| 2011/0219229 A1* | 9/2011 | Cholas et al. ................. 713/168 |
| 2011/0247045 A1* | 10/2011 | Rajagopal et al. ................. 726/1 |
| 2012/0240204 A1* | 9/2012 | Bhatnagar et al. ................ 726/5 |

FOREIGN PATENT DOCUMENTS

FR    2924843 A1    6/2009

* cited by examiner

*Primary Examiner* — Theodore C Parsons
(74) *Attorney, Agent, or Firm* — Robert Plotkin, P.C.; Robert Plotkin

(57) ABSTRACT

A computer implemented system and method for providing users with secured access to application servers have been disclosed. The system and method envisaged by the present disclosure are not restricted to providing users with secured access to application servers. The system and the method also ensure that transactions performed by the users through the application servers remain secured and hack-resistant. The present disclosure envisages a system that acts as a secured, trusted gateway between the users and the application servers associated with providers of sensitive services such as banking and financial institutions. In case of the system envisaged by the present disclosure, rather than directly accessing an application server, users are made to contact the system of the disclosure and upon verification of their respective identities, are allowed to access the application servers associated with providers of sensitive services.

8 Claims, 10 Drawing Sheets

SECURE ACCESS TO APPLICATION SERVERS USING OUT-OF-BAND COMMUNICATION

FIELD OF DISCLOSURE

The present disclosure relates to the field of providing users with secured private access to application servers for transactions.

BACKGROUND

Transactions such as electronic funds transfer, online banking, e-procurement of goods and services and transactions providing access to sensitive data through privileged accounts are considered to be sensitive in nature. Such transactions are considered sensitive because they constitute utilization of sensitive data such as the account number, personal identification number (PIN) in case of electronic funds transfer and username and confidential password in case of electronic data access. Similarly, service providers who provide the implementation of afore mentioned transaction and manage the transaction via at least their application servers are referred to as providers of sensitive services.

Banking and financial institutions (BFIs) are one of the examples of providers of sensitive services. BFIs provide users with several financial services including money transfer, online banking, e-commerce and the like. Typically, the transactions performed by the users with the applications servers associated with the BFIs involve exchange of sensitive user related information including but not restricted to user's bank account number, password and personal identification number. In today's scenario, it is quite common that a particular user has multiple online banking accounts and in order to facilitate easy recollection, users tend to associate all their online banking accounts with a single combination of authentication credentials which typically involve a username and a password. However, it is to be understood that authentication credentials can be associated with various other user accounts such as system administrator accounts, database management accounts and the like.

Since a single set of credentials are associated with multiple online accounts, there is a possibility that the credentials are utilized many number of times for obtaining services from multiple providers of sensitive services. Moreover, in today's scenario, users tend to make use of multiple communication gadgets such as mobile phones, application specific hard wares, laptop computers and desktop computers to access application servers associated with providers of sensitive services. In such cases, due to the multiplicity associated with the credentials and due to the fact that the credentials have been utilized across multiple gadgets, there is a possibility that the secrecy associated with the credentials might be compromised and further, the credentials might get subjected to hacker/phishing/spoofing and DNS/browser poisoning attacks.

Until now BFIs have been using several methods to completely secure their private back end networks. Private back end networks which are used for interbank, intrabank, POS transactions and swipe based transactions have been operated on specific hardware and software which offer considerable security to the aforementioned transactions. However, there exists no such private, secured front end network for BFI clients (users) who typically use public wireline/wireless networks to log on to the BFI servers. Despite the best efforts BFI unions find it difficult to enforce tight and right security measures for the clients logging onto BFI servers. Since clients make use of multiple devices to log onto the BFI servers, it is difficult to offer clients with secured private connectivity.

Therefore, there is felt a need for a system that provides a secure private front end network for BFI clients (users). The system should coexist with the internet but should only provide private access to those clients who need to log on to BFI servers. The system should aggregate such users right at the network switch point and provide them with secured private bandwidth to access to the requested BFI server, albeit post personal identification. The private front end network should also be able to offer resistance to phishing, DNS poisoning, middle man attacks, browser poisoning and the like which affect the existing BFI network to a greater extent. Some of the prior art systems that offer unique log in and unique personal identity include 'Open Identity Exchange' which concentrates on socializing the users' identities, Eco solutions hosted by RSA/Symantec for their enterprise partners on SSL platforms, and certain other programs like global ID card and ADHAR (Indian Government Initiative) biometric identification scheme. However none of these systems provide a private secured communication link to users on the internet for accessing BFI servers.

Some of the types of spoof attacks/hacker attacks are explained below:

Man-in-the-middle attack: Man-in-the middle attack is a form of eavesdropping. Here the attacker makes the victims (two parties involved in the communication) believe that they are talking directly to each other over a private connection, whereas the entire conversation would have been eaves dropped upon by the attacker.

Man-in-the-Browser attack: Man in the browser attack involves creating a Trojan that infects a Web browser. In a manner invisible to both the user and host application, this malware modifies the web pages, transaction contents and/or inserts additional transaction contents. This kind of an attack can succeed irrespective of whether security mechanisms such as PKI (Public Key Infrastructure) and/or two- or three-factor authentication solutions are in place.

Phishing Attacks: Phishing emails often include a link to a website that asks for personal or financial information with the intent of stealing personal/financial information such as banking passwords, credit cards PINs, and the like.

Pharming attack: Pharming attack is accomplished by changing some of the web address related information that ISP's store to increase the speed of web browsing. A virus alters the behavior of internet browsers by redirecting the user to a fictitious site when they attempt to log on to websites.

Trojan Horse attacks: Trojan Horse attacks infect a computer through websites or via emails. Trojan is a program that can record keystrokes and send information back to its home base.

Domain Name System (DNS) high-jacking: DNS high jacking is performed by exploiting the DNS server software or by changing the host file resident on a particular computer. The hacker redirects the data traffic meant for that particular computer, to another bogus website.

Denial-of-Service (DoS) attacks make the websites unavailable either temporarily or indefinitely thereby resulting in non-availability of the corresponding web sites.

In a conventional land line communication environment, users (referred to as 'users' hereafter) use their communication gadgets to access the application servers associated with providers of sensitive services. The bandwidth required by users to access application servers is provided by a traditional ADSL (Asymmetric Digital Subscriber Line) communication line which is simultaneously utilized by multiple internet service providers to provide internet connectivity to their respective users. The security available to such shared ADSL lines is restricted to standard cryptographic applications. Given the widespread use of shared ADSL lines, it is possible that even unethical users and hackers are conversant with the encryption standards used across the shared communication lines. Since users make use of shared ADSL lines which are commonly used by multitude of users to access the internet, there is a possibility that the transactions performed by users over the shared ADSL lines may be hacked onto. Moreover, since even application servers are made accessible through the shared ADSL line, there is a possibility that any financial transaction initiated by the user, and approved, managed by the corresponding application server might be hacked onto. Moreover, since shared communication lines do not offer the facility of tracing the users, it is next to impossible to ascertain the origin of the user requesting an access to application servers. Further, there is no clear possibility at the service providers firewall for any user to exit based on the site they want visit Or BFI to restrict the user coming from an unrecognized firewall.

A similar situation exists for all the data connections offered on the wireless network. Here, though users use their mobile devices to make on data call or log in, such calls are rerouted at the wireless message switch center and exists to external WWW domain through operator's firewall and hence dilutes the rest of the security that current mobile infrastructure enjoys. It means, in both communication links there is no privacy offered based on the business needs. Even though, there exists an independent cryptographic process to circumvent, which is proved inadequate and hence there is huge amount of cash drain and business credibility.

Systems facilitating enterprise log-ins, escrow management logins, cloud management and the like also face issues similar to that of BFIs and there is a requirement for a solution that can be effectively extended to all the aforementioned systems. Moreover, there is felt a need for a system which:
- provides users with safe and hacker resistant private communication channel bandwidth for communication with application servers associated with providers of sensitive services;
- provides a single, private window solution for communication between all the available providers of sensitive services and their respective users;
- ensures that the level of security made available to all providers of sensitive services and their respective users is uniform in nature, yet dynamic in terms of security;
- ensures that at least the user is authenticated before the commencement of a transaction;
- ensures that users as well as application servers associated with providers of sensitive services are authenticated before the commencement of transactions;
- ensures that every frame involved in a user transaction is secured and the server involved in the user transaction is authenticated every time a transaction is initiated;
- makes use of hybrid communication techniques to ensure that transactions performed through the system are on a private communication channel and hence hacker resistant; and
- offers 'out of band' and private mode of communication between application servers associated with providers of sensitive services and their respective users.

OBJECTS

Some of the non-limiting objects of the present disclosure, which at least one embodiment herein satisfies, are as follows:

An object of the present disclosure is to provide users with safe and hacker resistant private secured communication channel for connecting to application servers associated with providers of sensitive services.

One more object of the present disclosure is to provide a private, single window solution for communication between all available providers of sensitive services and their respective users.

Yet another object of the present disclosure is to provide a system that ensures that the level of security made available to all providers of sensitive services and their respective users is uniform in nature.

Still a further object of the present disclosure is to provide a system that ensures that at least the user is authenticated before the commencement of a transaction.

Another object of the present disclosure is to provide a system that ensures that users as well as application servers associated with providers of sensitive services are clearly authenticated and every frame of the transaction is secured.

One more objective of the present disclosure is to provide a system that makes use of multiple private communication techniques to ensure that transactions performed through the system are hacker resistant.

Another object of the present disclosure is to make available a system that offers 'out of band' and private mode of communication between application servers associated with providers of sensitive services and their respective users.

Yet another object of the present disclosure is to provide out of band connectivity and services at both user end as well as application server end.

Still a further object of the present disclosure is to provide a system that makes use of global 'two-factor challenge' mechanism to appropriately identify/authenticate the user.

Another object of the present disclosure is to provide a system that offers easy retrofit in terms of deployment.

Yet another object of the present disclosure is to provide a system that leaves zero foot print despite the system being accessed from non-secured web environments including cyber cafes, Wi-Fi zones and the like.

Still a further object of the present disclosure is to provide a system which provides user with access to application servers associated with providers of sensitive services only after the user has authenticated him/her with the system.

Another object of the present disclosure is to provide a system that makes use of 'geo location tracing' techniques to identify the location of the user trying to access the system.

Yet another object of the present disclosure is to make available a system that provides user with common credentials corresponding to multiple providers of sensitive services.

Still a further object of the present disclosure is to provide a system that is highly scalable, robust and cost efficient to enjoy the benefits of ubiquitous internet offerings.

Other objects and advantages of the present disclosure will be more apparent from the following description when read in conjunction with the accompanying figures, which are not intended to limit the scope of the present disclosure.

SUMMARY

The present disclosure envisages a computer implemented system for providing users with secured access to application servers. The system, in accordance with the present disclosure includes:

a communication engine communicating with a set of communication gadgets, the communication engine configured to receive at least one request from a requesting communication gadget, wherein the request corresponds to a request to access at least one application server;

hybrid telecommunication means cooperating with the communication engine, the hybrid telecommunication means adapted to establish an out-of band, private communication link (both at user end and at application server end) with the requesting communication gadget and allocate out-of-band, private communication bandwidth to the requesting communication gadget, wherein the type of the out-of-band, private communication link is determined based on the type of the communication channel previously associated with the requesting communication gadget.

In accordance with the present disclosure, the system includes an authentication engine communicating with the requesting communication gadget through the out-of-band, private communication link, the authentication engine comprising:

challenge-generation means adapted to utilize the out-of-band, private communication bandwidth to transmit multi-factor challenges including first factor challenge, second factor challenge and third factor challenge, to the requesting communication gadget;

verification means adapted to verify the identity of the user associated with the requesting communication gadget based on the user's response to at least one of the multi-factor challenges, the verification means further adapted to verify authenticity of the application server requested access to by the user, based on at least digital certificates associated with the application server; and Linking means adapted to use the private, out of band communication bandwidth to establish a private, out-of-band communication link between the requesting communication gadget and the application server only in the event that the user and the application server are successfully verified by the verification means.

In accordance with the present disclosure, the hybrid telecommunication means further includes switching means adapted to automatically switch the requesting communication gadget onto the out-of band, private communication link.

In accordance with the present disclosure, the authentication engine includes a repository adapted to store at least one of a plurality of random numbers, a plurality of picture identifiers, a plurality of captchas, unique biometric credentials corresponding to the users, a plurality of alphanumeric characters and a plurality of equations.

In accordance with the present disclosure, the challenge generation means includes third means cooperating with the repository and adapted to optionally generate a third factor challenge in the form of a limited duration one-time equation.

In accordance with the present disclosure, the out-of-band, private communication bandwidth is allotted through out-of-band, private communication link selected from the group consisting of private wired communication link, private wireless communication link and private wireless based network connection.

In accordance with the present disclosure, the system further includes terminating means adapted to automatically terminate the out-of band, private communication link on completion of communication between the requesting communication gadget and the application server requested access to by the user.

The present disclosure envisages a computer implemented method for providing users with secured access to application servers. The computer implemented method, in accordance with the present disclosure includes the following steps:

receiving at least one request from a requesting communication gadget associated with a user, wherein the request corresponds to a request to access at least one application server;

tracing the location of the requesting communication gadget and tracing the type of communication channel utilized by the requesting communication gadget to transmit the request;

allocating out-of-band, private communication bandwidth to the requesting communication gadget and establishing an out-of band, private communication link with the requesting communication gadget;

utilizing the out-of-band, private communication bandwidth to transmit multi-factor challenges including first factor challenge, second factor challenge and third factor challenge, to the requesting communication gadget;

verifying the user associated with the requesting communication gadget based on the user's response to at least one of the multi-factor challenges, and verifying authenticity of the application server requested access to by the user, based on at least digital certificates associated with the application server; and using the private, out of band communication bandwidth to establish a private, out-of-band communication link between the requesting communication gadget and the application server only in the event that the user and the application server are successfully verified.

In accordance with the present disclosure, wherein the step of establishing an out-of band, private communication link with the requesting communication gadget further includes the step of automatically switching the requesting communication gadget onto the private, out-of-band communication link.

In accordance with the present disclosure, the step of using the private, out of band communication bandwidth to establish a private, out-of-band communication link with the requesting communication gadget further includes the step of initiating an SSL (Secured Socket Layer) handshake with the requesting communication gadget. In accordance with the present disclosure, the step of using the private, out of band communication bandwidth to establish a private, out-of-band communication link with the requesting communication gadget further includes the step of automatically terminating the private, out-of-band communication link on completion of communication between the requesting communication gadget and the application server.

BRIEF DESCRIPTION OF THE ACCOMPANYING DRAWINGS

The computer implemented system and method for providing users with secured access to application servers will now be described with reference to the non-limiting, accompanying drawings, in which.

Figure 2:
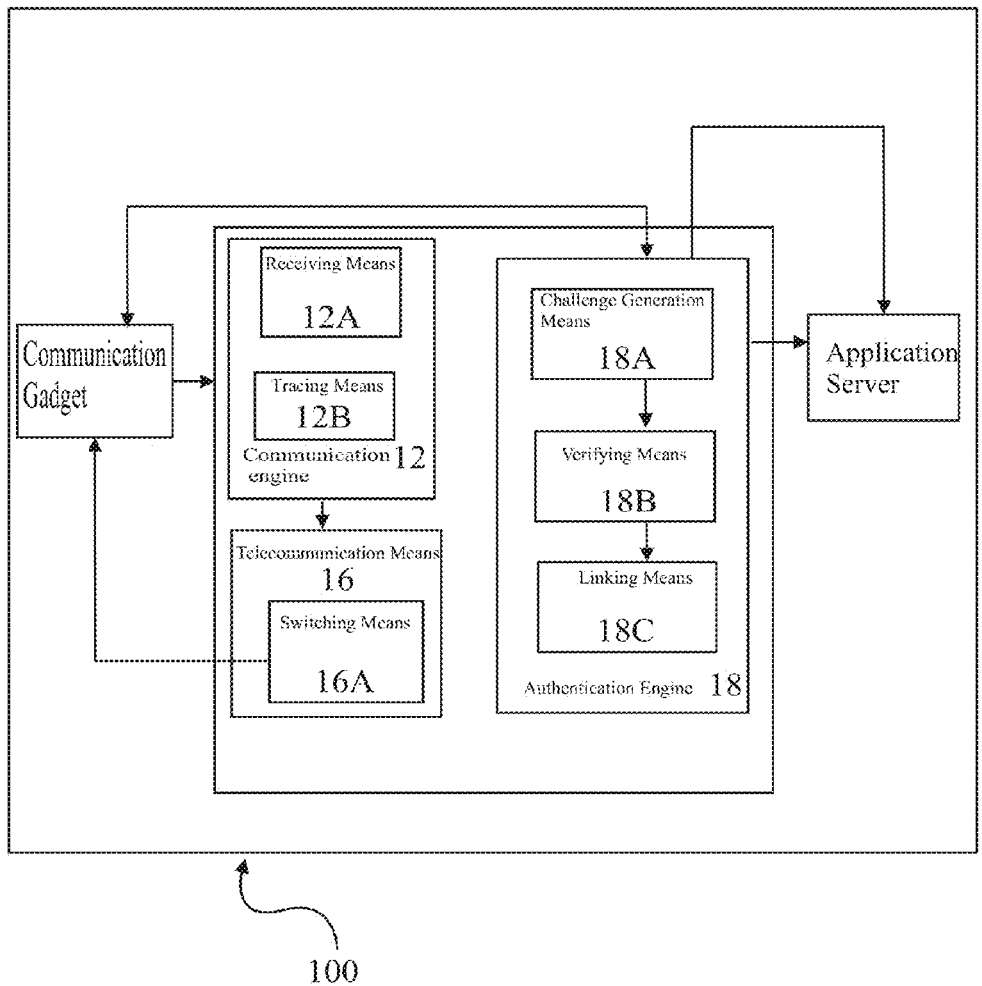
FIG. 2 is a schematic representation of the system for providing users with secured access to application servers, in accordance with the present disclosure.
Figure 2A:
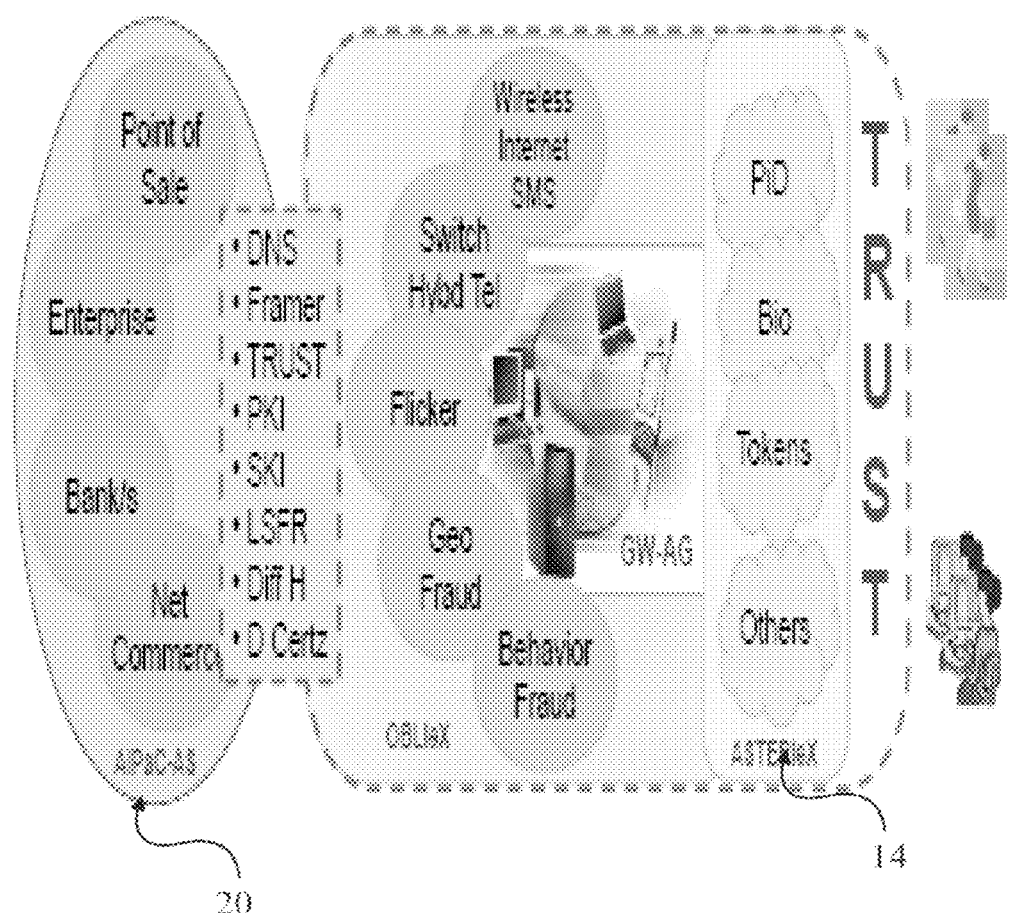
FIG. 2A is a block diagram depicting the connectivity between the authentication engine and the application server, in accordance with the present disclosure.
Figure 2B:
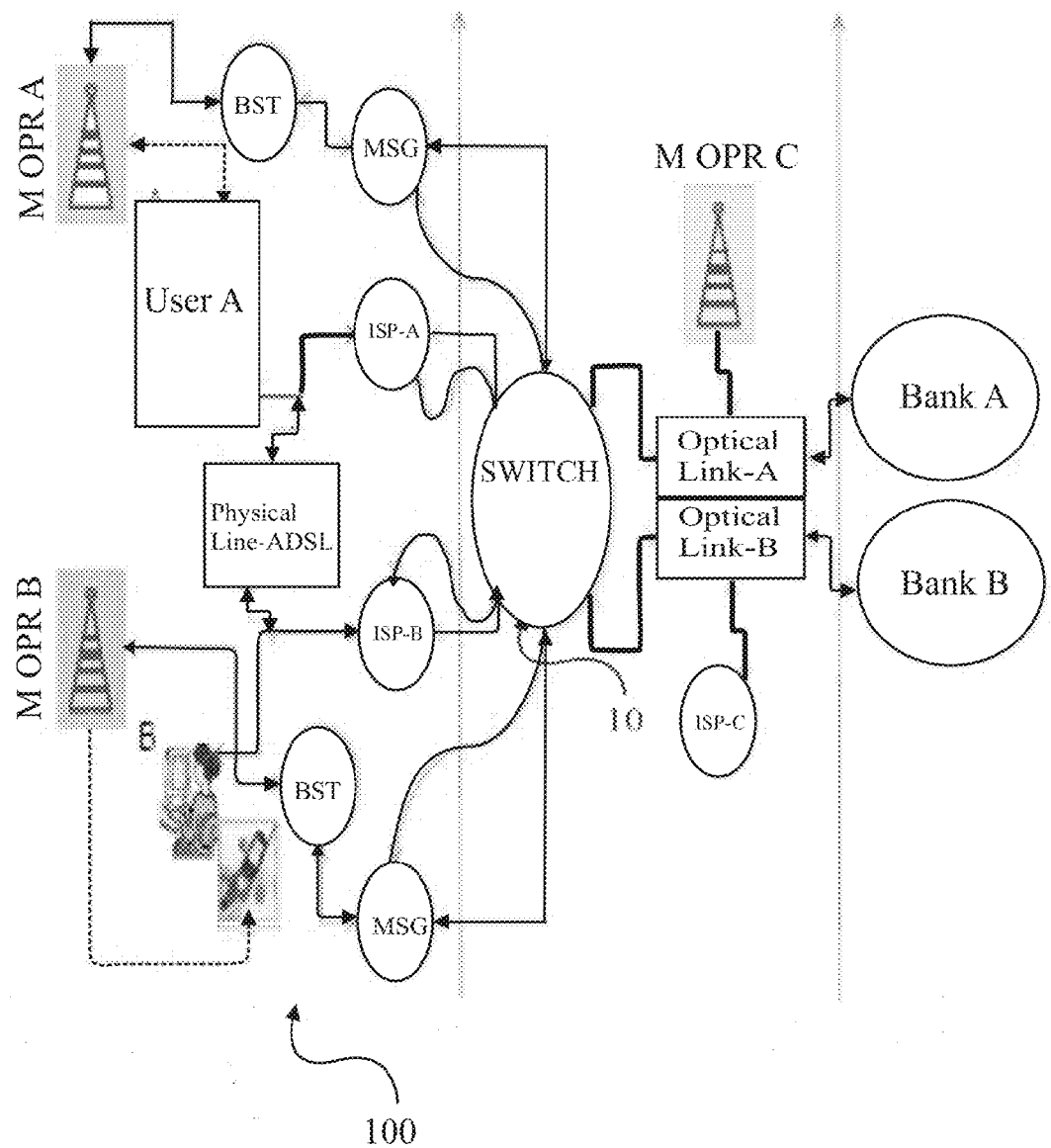
Figure 2C:
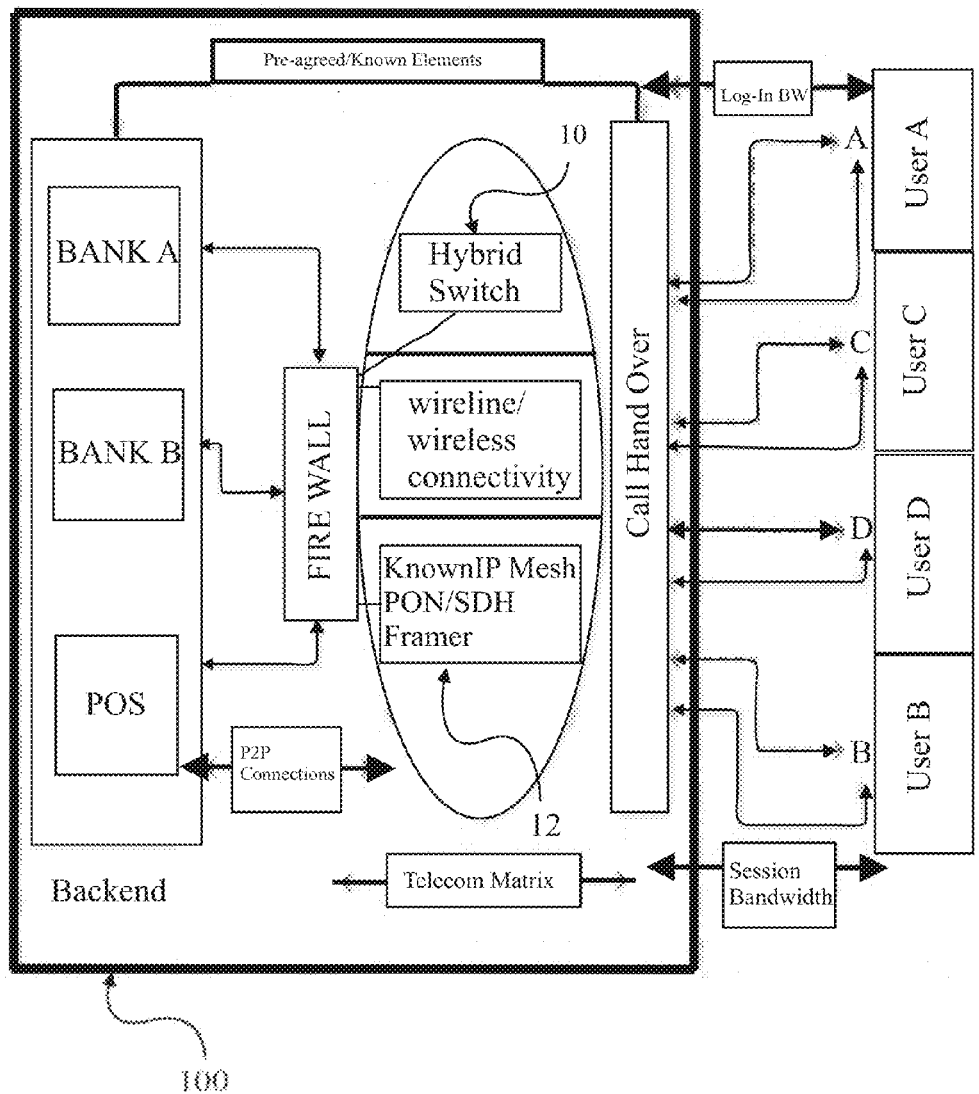
Figure 3:
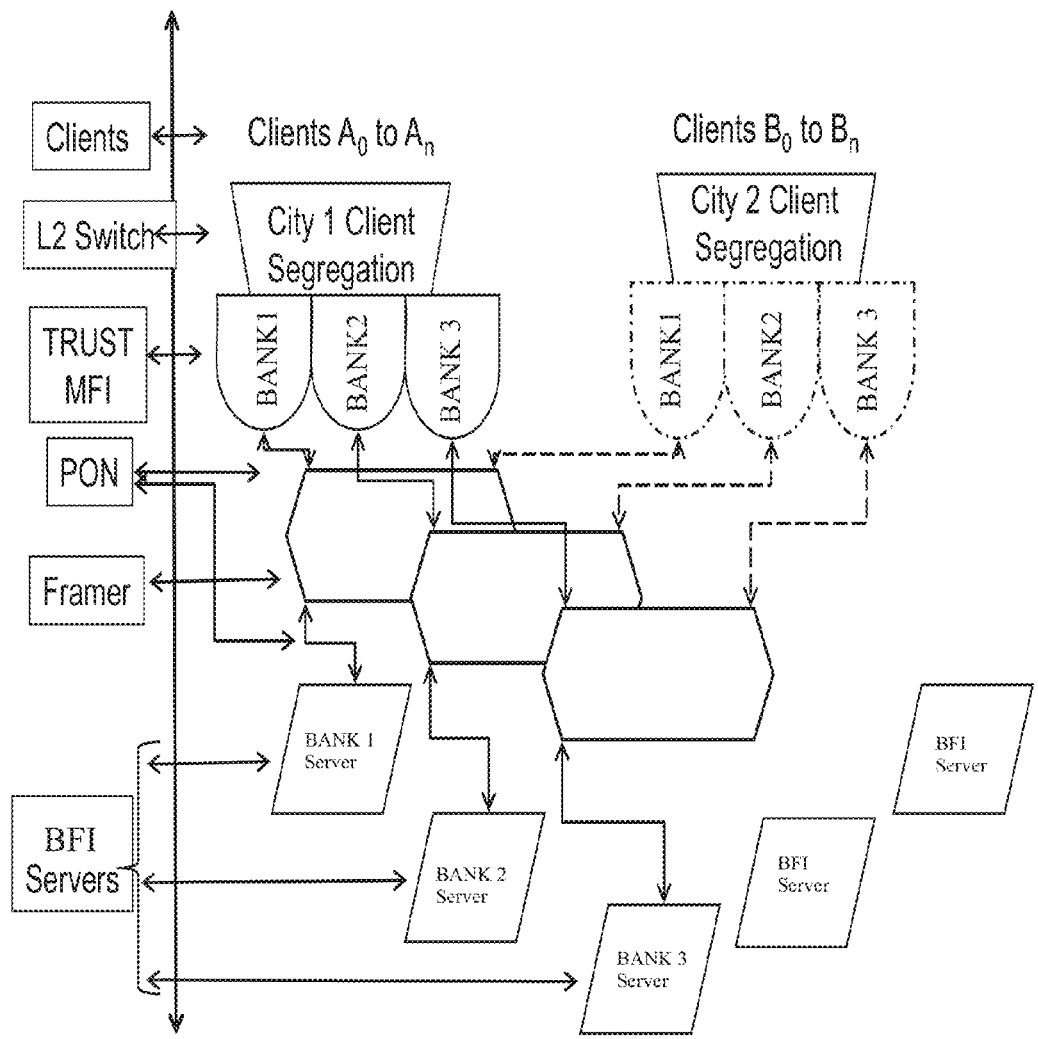
Figure 4A:
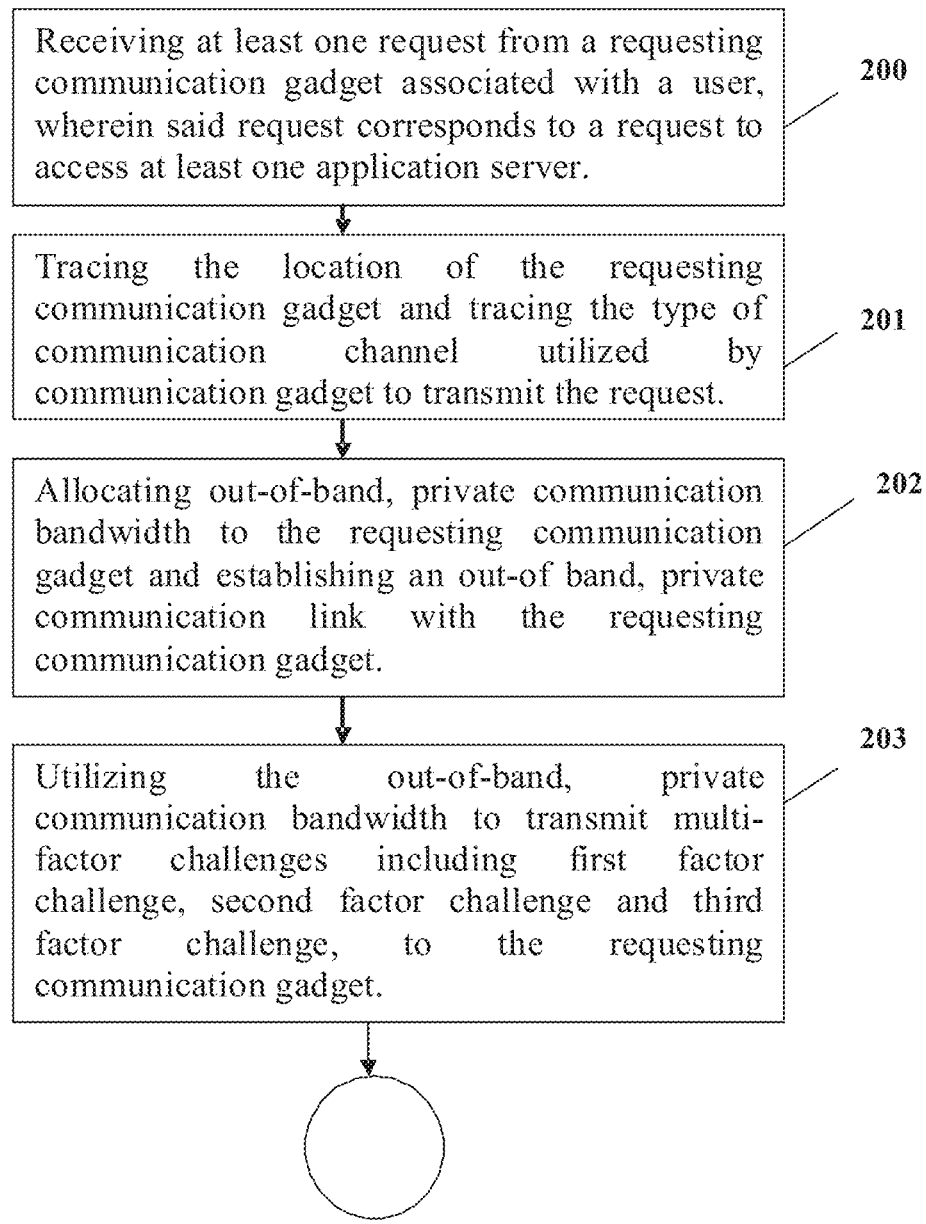
Figure 4B:
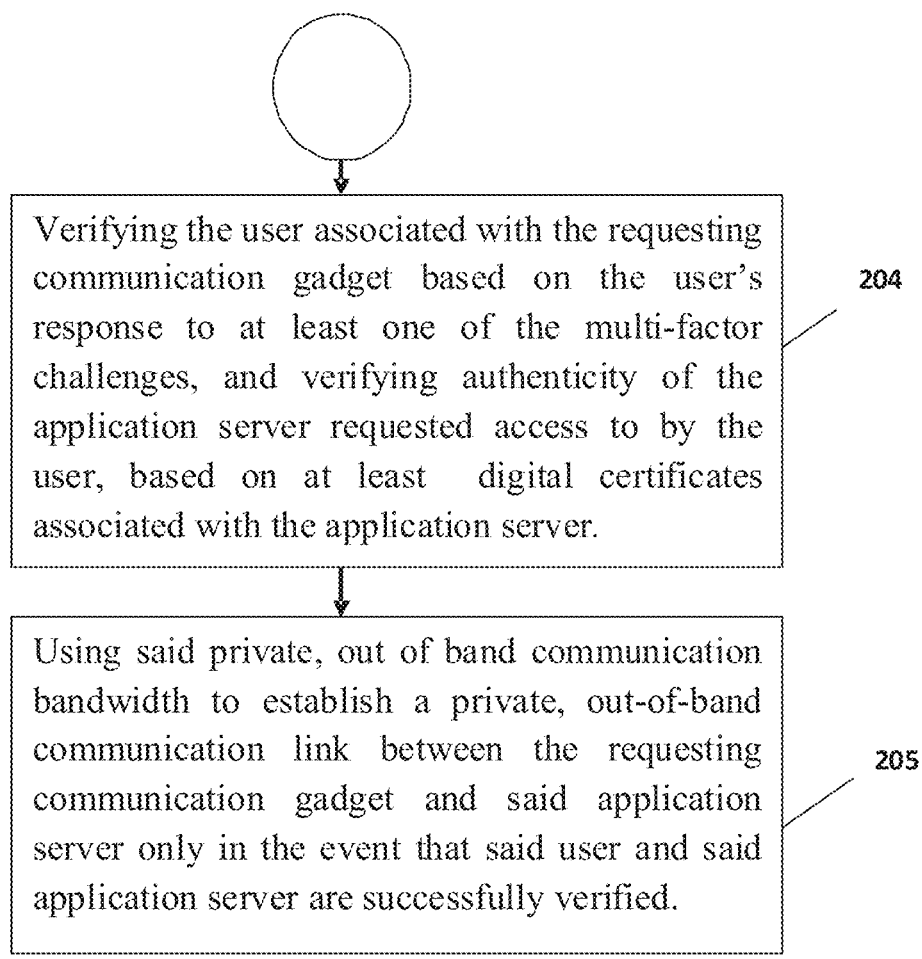
Figure 5:
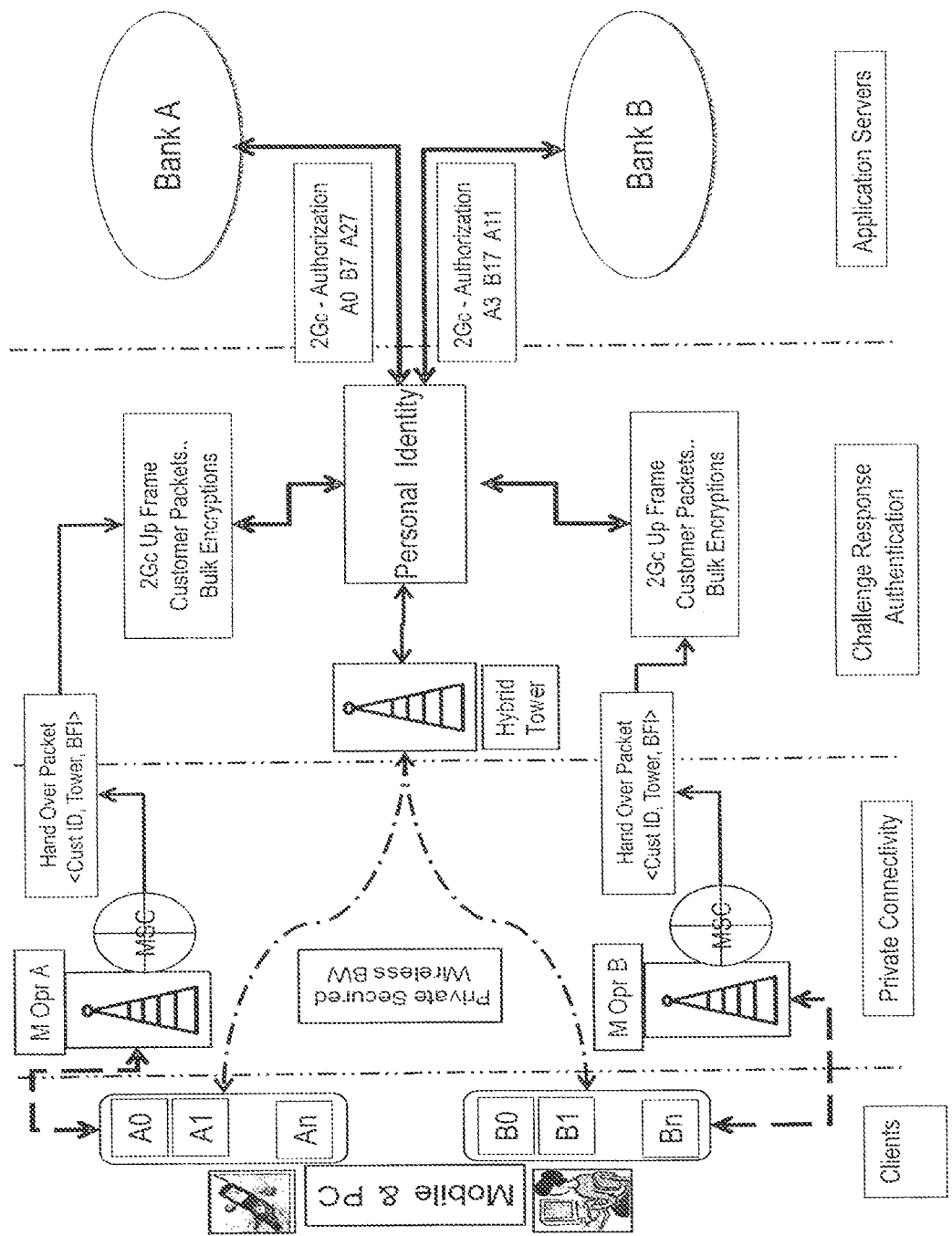

FIG. 2B provides a pictorial representation of the manner in which the system of the present disclosure provides users with secured access to application servers;

FIG. 2C illustrates the implementation of the backend application corresponding to the system of the present disclosure;

FIG. 3 illustrates the flow of data across the system envisaged by the present disclosure;

FIGS. 4A and 4B correspond to a flow chart illustrating the steps involved in the method for facilitating secured internet payment and transactions, in accordance with the present disclosure;

FIG. 5 corresponds to a flow chart illustrating the communication between the end users and application servers, in accordance with the present disclosure.

DETAILED DESCRIPTION OF THE ACCOMPANYING DRAWINGS

The present disclosure will now be described with reference to the accompanying drawings which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The system and method envisaged by the present disclosure are not restricted to providing users with secured access to application servers. The system and the method also ensure that transactions performed by the users through the application servers remain secured and hack-resistant. The term 'transaction' in this specification indicates sensitive transactions including but not restricted to electronic funds transfer, e-procurement of goods and services, online banking operations, transactions providing access to privileged and sensitive data items and the like. The utility of the system and the method envisaged by the present disclosure is not restricted to handling the transactions corresponding to banking and financial institutions and can be extended to handle any kind of transaction including electronic data access and the like.

Typically, the aforementioned transactions are implemented electronically. Since most of the aforementioned transactions are sensitive in nature, users carrying out these transactions need to authenticate themselves before carrying the transactions. Typically, a particular user has to perform multiple transactions corresponding to multiple providers of sensitive services and for the sake of recollection, users tend to associate the same set of credentials (typically, a common user name and common password) for accessing a plurality of application servers such as file transfer server, banking servers and the like. Moreover, users' use of multiple communication equipment's/gadgets such as laptop computers, mobile phones and the like to communicate with application servers associated with providers of sensitive services. In such cases, due to the multiplicity associated with the authentication credentials and due to the fact that the credentials have been utilized across multiple gadgets, there is a possibility that the secrecy associated with the authentication credentials might be compromised and further, the authentication credentials might be subjected to hacker/phishing/spoofing attacks and subsequently get misused.

Figure 1A:
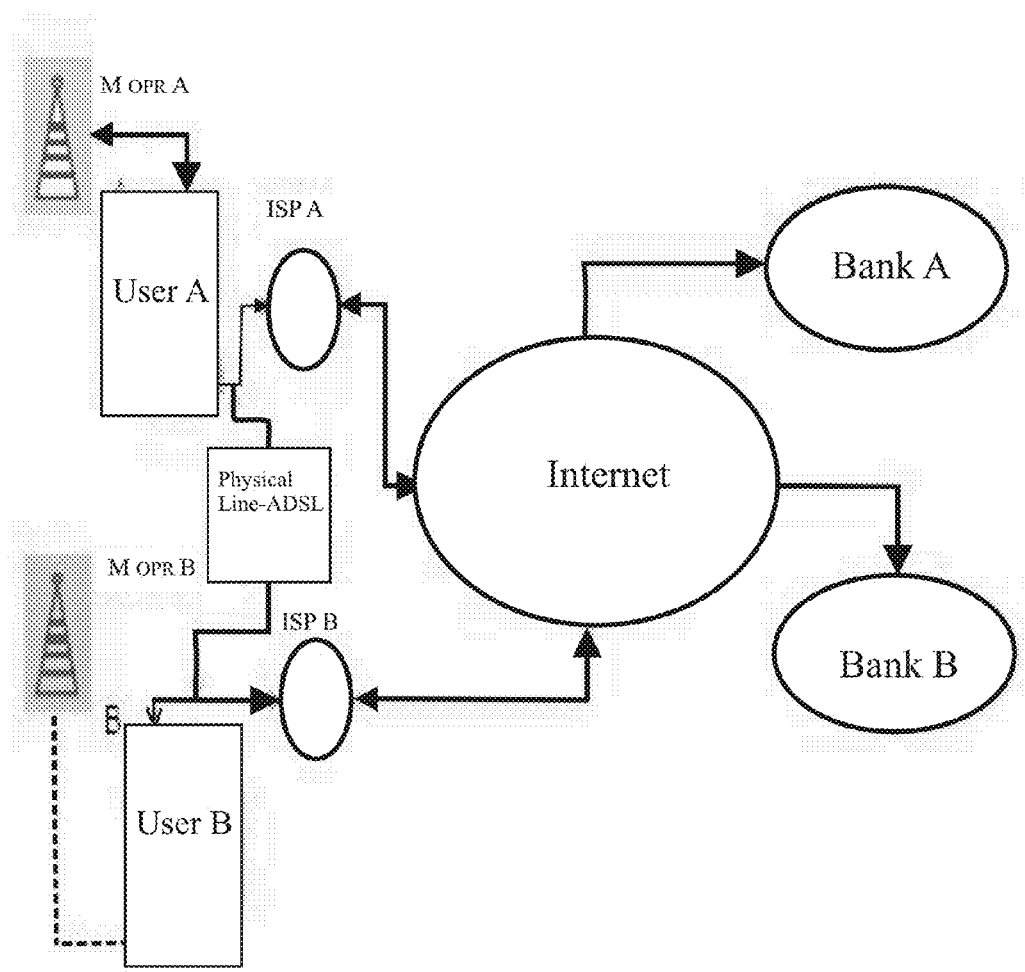
FIG. 1A and FIG. 1B are schematic representations of the prior art systems utilized for providing access to application servers associated with providers of sensitive services.

FIG. 1A illustrates the prior art system for carrying out electronic transactions. In the prior art system, users make use of communication gadgets to access the application servers. As shown in FIG. 1A, 'User A' and a 'User B' use their wire-line/wireless communication gadgets including but not restricted to mobile phone, laptop computer, desktop computer and iPad to log on to the Internet to connect to the desired financial institution 'Bank A' or 'Bank B'. As seen in FIG. 1A, the 'User A' connects to the 'ISP A' and 'User B' connects to 'MISP B' (Mobile Internet Service Provider) using a range of technologies including 3G based mobile wireless network or physical ADSL (Asymmetric Digital Subscriber Line) line. Subsequently, User 'A' and User 'B' log on to the predetermined public net-banking website associated with respective banks using their pre-registered login credentials. The safety of the credentials and the financial transaction data is ensured by the utilization of cryptography applications interfaces in the prior art system. This conventional mode of carrying out a financial transaction is not secure as it is not possible to offer the private connection details between the bank and users, thus an illegitimate connection cannot be refused by the net-banking application. Moreover, traditional ADSL communication line or traditional mobile wireless networks are simultaneously utilized by multiple internet service providers to provide internet connectivity to their respective users. The security available to such shared ADSL lines/mobile wireless networks is restricted to standard cryptographic applications. Given the widespread use of shared ADSL lines and mobile wireless networks, it is possible that unethical users and hackers are conversant with the encryption standards used across standard, shared communication lines. Therefore, there is a possibility that the transactions performed by users over the shared ADSL lines/mobile wireless networks may be hacked onto. Moreover, since even application servers, in this case the application servers associated with 'Bank A' and 'Bank B' are made accessible through shared ADSL line/mobile wireless network, there is a possibility that any financial transaction initiated by the user, and approved, managed by the corresponding application server might also be hacked onto. Moreover, since application servers are accessed via shared ADSL lines or shared GPRS based communication link, there is a possibility that hackers could also hack onto the application servers.

Figure 1B:
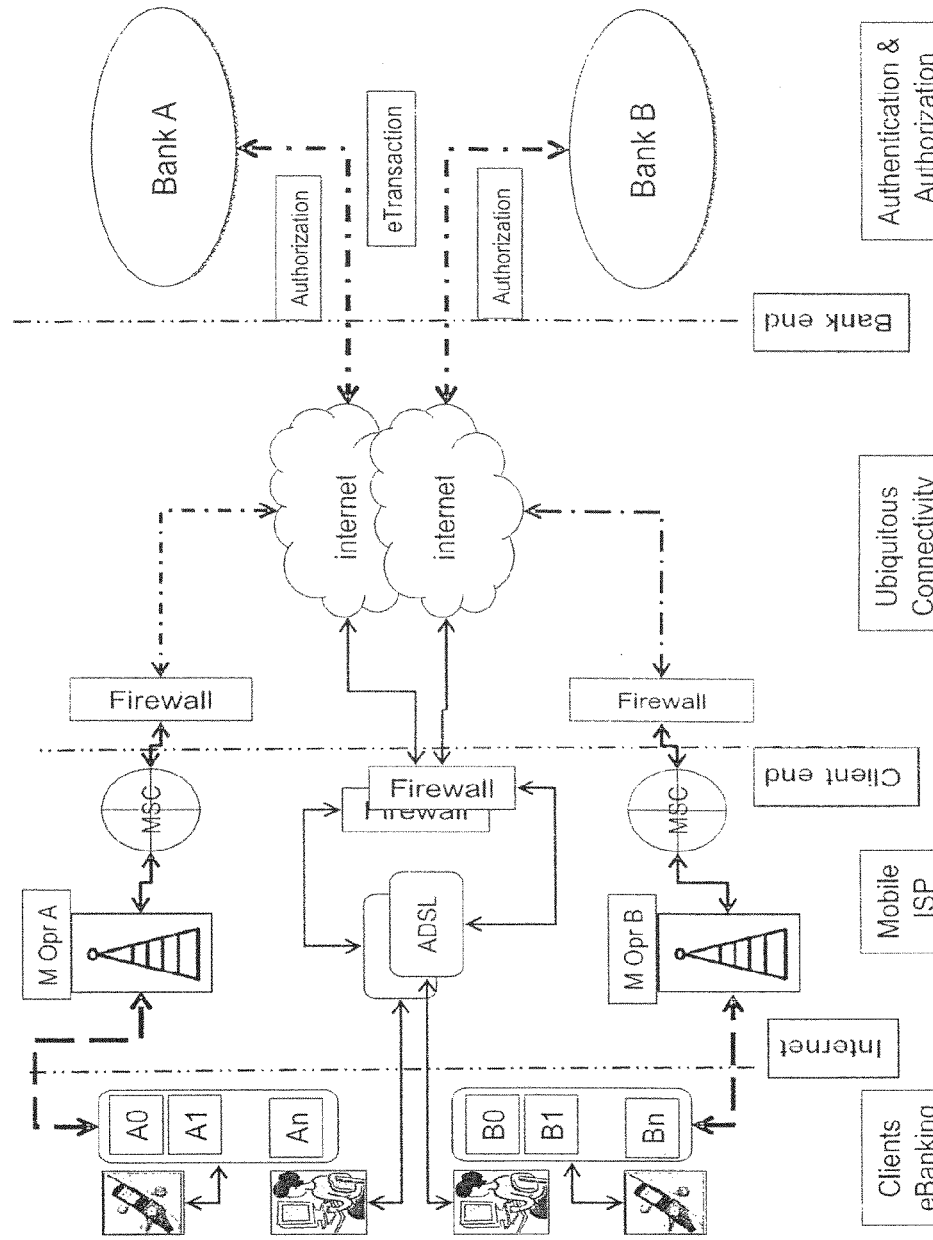

FIG. 1B illustrates the prior art system for carrying out electronic transactions through users' communication gadgets including mobile phones and personal computers. As shown in FIG. 1B, users $A_0$ to $A_n$ and users $B_0$ to $B_n$ use their wireless communication gadgets including but not restricted to mobile phone, and iPad to log on to the Internet to connect to the desired financial institution 'Bank A' and 'Bank B' respectively. As seen in FIG. 1B, the 'User A' connects to the 'MISP A' and 'User B' connects to 'MISP B' using a range of technologies including 3G based mobile wireless network. Subsequently, User 'A' and User 'B' log on to the predetermined public net-banking website associated with respective banks using their pre-registered login credentials. The safety of the credentials and the financial transaction data is ensured by the utilization of cryptography applications interfaces in the prior art system. This conventional mode of carrying out a financial transaction is not secure as it is not possible to offer the private connection details between the bank and users, thus an illegitimate connection cannot be refused by the net-banking application. Moreover, traditional mobile wireless networks/physical ADSL lines are simultaneously utilized by multiple internet service providers to provide internet connectivity to their respective users. The security available to such shared mobile wireless networks/physical ADSL lines is restricted to standard cryptographic applications. Given the widespread use of mobile wireless networks, it is possible that unethical users and hackers are conversant with the encryption standards used across standard, shared communication lines. Therefore, there is a possibility that the transactions performed by users over the shared mobile wireless networks/physical ADSL lines may be hacked onto. Moreover, since even application servers, in this case the application servers associated with 'Bank A' and 'Bank B' are made accessible through shared mobile wireless network/physical ADSL lines, there is a possibility that any financial transaction initiated by the user, and approved, managed by the corresponding application server might also be hacked onto. Moreover, since application servers are accessed via shared GPRS/3G based communication link/physical ADSL lines, there is a possibility that hackers could also hack onto the application servers.

Moreover, the conventional mode of carrying electronic transactions requires users to register themselves individually to each service provider and thus maintain multiple identities or multiple sets of authentication credentials which more often lead to duplication of authentication credentials for easy recollection and makes them vulnerable to guess attacks, wherein the hacker is able to guess a particular user's authentication credentials.

Therefore, to overcome the drawbacks associated with the conventional mode of carrying out electronic transactions and to overcome the shortcomings associated with the prior art systems, the present disclosure envisages a system and method for providing users with secured access to application servers. The present disclosure envisages a system that acts as a secured, trusted gateway between the users and the application servers associated with providers of sensitive services such as banking and financial institutions and the like. In case of conventional systems users directly contact or log on to the application servers associated with providers of sensitive services. But in case of the system envisaged by the present disclosure, users are made to contact the system of the disclosure and upon verification of their respective identities, are allowed to access the application servers associated with providers of sensitive services.

If we consider the example of sensitive electronic financial transactions, most of the users initiating electronic financial transactions use multiple accounts having the same set of credentials (common username and password) and gadget to interact with the application servers associated with BFIs (Banking and Financial Institutions; referred to as providers of sensitive services hereafter). The phenomenon of utilization of multiple communication gadgets coupled with the use of common username and common password for multiple yet diverse transactions compromises the secrecy associated with the credentials and renders the transactions vulnerable to hacker attacks, phishing attacks, spoofing attacks and the like. The vulnerability associated with the transactions increases multifold due to the fact that providers of sensitive services cannot assure users of the availability of secured communication channel and users are forced to make use of network bandwidth that is shared and accessible by multitude of internet users.

Therefore, to provide users with a secured, private communication channel for conducting sensitive transactions and to ensure that sensitive transactions remain secured irrespective of the type of the gadget used for communication and also to absolve providers of sensitive services from the responsibility of providing secured communication channel to the users for performing the transactions and ensuring the security of the transactions carried out by users, the present disclosure offers a system and method that acts as a trusted gateway between the application servers associated with providers of sensitive services and users. The system envisaged by the present disclosure also makes it mandatory for users to establish communication with the system which acts as an intermediary server. The system, acting as an intermediary server verifies the credentials of users and on successful verification of user's credentials redirects the user onto the requested application server, through a private secured communication channel established between the user's communication gadget and the application server. Such a redirection takes place over a private communication network which offers private, out-of-band bandwidth for such communications and is inaccessible to any person other than the user who has accessed, and who has been authenticated by the system of the present disclosure. The user is subsequently made to use the private, out-of-band communication link to carry out his/her transactions. By offering a private communication bandwidth to the users, the system of the present disclosure makes sure that the transactions performed by users are completely secured. Further, by authenticating the users when they log on, the system of the present disclosure absolves providers of sensitive services of the responsibility of authenticating their respective users. Still further, the system of the present disclosure offers unique three factor challenges to the users to have a definite identification of their web identity.

Moreover, the system absolves users from the responsibility of remembering multiple sets of authentication credentials and instead provides a single multi factor authentication based login process which could in turn be used to access the services offered by all the service providers registered with the system of the present disclosure. Also, users are connected to desired application servers through exclusively allotted session-based, private bandwidth. Thus, the present disclosure provides a secure and private network for communication between users and providers of sensitive services.

The system of the present disclosure implements the following aspects in order to make electronic transactions secure and hack resistant:
    one set of authentication credentials for accessing multiple application servers: every user is provided with a single set of authentication credentials to access services offered by diverse providers of sensitive services thus, eliminating the problem of multiplicity of authentication credentials;
    multi factor authentication: users can opt for one or more levels of authentication/challenge response process using pictures, numbers and bio prints as a part of their single set of authentication credentials. Users can also preselect one or more non-verbal pictures to confirm authenticity of the source server. The preselected non-verbal pictures aid in defusing DNS (Domain Name System) poisoning and related issues;

the application servers involved in the process of communication are not hosted on DNS (Domain Name System) network and therefore are resistant to DNS poisoning and other related security issues;

behavioral and geo-location tracing: the system of the present disclosure, on confirmation of the user's authentication credentials, traces the last node (kerb) utilized by the user in case of Internet connection and traces the MSC (Mobile Services Switching Center) utilized by the user in case of wireless mobile connections. The behavioral and geo-location trace enables the system to determine the identity of the user and reject any illegitimate connections;

cookie management: the system of the present disclosure performs look-ahead cookie management by inflicting dynamic changes onto the web browser of the requesting communication gadget associated with the user and subsequently destroys the changes post disconnection, so zero footprint is available to hackers, especially in hostile environments such as cybercafés and airports;

dedicated, out of band, private communication channel: a dedicated out of band, private communication channel is made available to the user when he/she logs on to the system;

cryptographically correct authentication and authorization gateway: the system of the present disclosure initiates a SSL (Secure Socket Layers) handshake with the requesting communication gadget associated with the user, performs multi factor authentication for the user, writes an Internet cookie onto browsers associated with the requesting communication gadget, and verifies the digital certificate of the application server before redirecting the user onto the application server via a secured, private, out of band communication channel;

secure mapping between diverse communication channels: the system of the present disclosure provides communication mechanisms to interface communication channel selected by the user with the Passive optical network associated with the application servers;

with a private and secured communication channel established between the user's communication gadget and the corresponding application server, proprietary and confidential information can be exchanged on cryptographically secured, browser independent API (Application Programmer Interface) pages; and pay as you use revenue model: providers of sensitive services are billed using the 'pay as you use' revenue model which computes cost based on the bandwidth utilized by a specific service provider.

Referring to FIG. 2, there is shown a block diagram corresponding to the system 100 for facilitating secure electronic transactions. The system 100, in accordance with the present disclosure includes a communication engine denoted by the reference numeral 12. The communication engine 12 facilitates the interaction between the system 100 and users who wish to access the system 100 for the purpose of further accessing the application servers associated with providers of sensitive services such as BFIs. The communication engine 12 includes a switch (not shown in figures) which enables multiple users to simultaneously log-onto the system 100. The switch could be a metro level 'L2' switch. The communication engine 12 includes receiving means denoted by the reference numeral 12A which is adapted to receive at least one request from a user, wherein the request corresponds to a request to access at least one application server. The communication engine 12 ensures that each application server connected to the system 100 has a dedicated passive optical network (PON) connection. The PON connection provided by the communication engine 12 includes dedicated fiber optic links between each of the application servers and the system 100.

The communication engine 12 connects a user to the system 100 using the conventional wire line/wireless/3G/ In accordance with the present disclosure, the communication engine 12 further includes tracing means denoted by the reference numeral 12B. As soon as a user logs onto the system 100 through the conventional wireline/wireless/3G network, the tracing means 12B traces the location of the last kerb or the equivalent last mile (node), i.e., the location of the communication gadget used by the user to log-on to the system 100. In case if the last kerb (node/communication gadget) associated with the user is a desktop computer/laptop computer and if the desktop computer/laptop computer includes a wireline network connection then the tracing means 12B traces the location of such desktop computer/laptop computer. Subsequent to the tracing of the location of user's last kerb (node), the responsibility of providing wireline network connectivity is handed over from the conventional telecommunication network provided by the standard Internet Service Provider (ISP) to the private telecommunication network offered by the hybrid telecommunication means 16. Accordingly, if the tracing means 12B determines that the last kerb (node) associated with the user is a /3G enabled mobile phone, then the tracing means 12B traces the location of the mobile device (in connectivity) utilized by the user to log onto the system 100 and subsequently the responsibility of providing wireless network connectivity is handed over from the conventional 3G based telecommunication network to the private telecommunication network offered by the hybrid telecommunication means 16.

The hybrid telecommunication means 16, in accordance with the present disclosure performs the task of allocating private, secured, out of band wireline/wireless bandwidth for, firstly the communication between the user's communication gadget and authentication engine 18 and secondly for the communication between the user's communication gadget and the application server requested access to, by the user. When the responsibility of providing the network connectivity is handed over from the conventional telecommunication network provided by the standard Internet Service Provider (ISP) to the private telecommunication network offered by the hybrid telecommunication means 16, the hybrid telecommunication means 16 allots session-based private, secured bandwidth, at least temporarily, to that particular user. If it is determined that the user has logged in using a wireless device then wireless, session-based, secured, private, out-of-band bandwidth is allotted otherwise wire-line, session-based, out-of-band bandwidth.

The hybrid telecommunication means 16 manages its own bulk wireline/wireless bandwidth and enables the user's communication gadget to connect to the system 100 or to the application server to which the user requires access. The private, out-of-band, session-based wireline/wireless bandwidth allocation ascertains that the communication between the user and the application server is private, secure and thus invisible to others users of World Wide Web. The dedicated session-dependent, private and out-of-band bandwidth allocation also facilitates secured tunnel management for each session.

The hybrid telecommunication means 16 includes switching means denoted by the reference numeral 16A for initiating "Handover" of the transaction from conventional communication network to the private, out-of-band communication network/link. The switching means 16A redirects the user logging onto to the system 100 from the telecommunication network provided by mobile operators or the telecommunication network provided by conventional internet service providers to the private, out-of-band communication link offered by the hybrid telecommunication means 16.

In accordance with the present disclosure, as soon as the user is redirected to the private, out-of-band communication link offered by the hybrid telecommunication means 16, the authentication engine 18, through the private, out-of-band telecommunication link initiates a secured random pattern/session specific/frame specific handshake with the requesting communication gadget associated with the user and performs multi factor authentication for the user. The authentication engine 14 offers at least a first factor challenge, preferably a second factor challenge and optionally a third factor challenge to the user through the private, out-of-band telecommunication link.

In accordance with the present disclosure, the authentication engine 18 includes challenge generation means 18A adapted to provide users with at least the first factor challenge, preferably the second factor challenge and the optional third factor challenge. In a typical Multi Factor Authentication process, several challenges including, OTPs (One Time Passwords), pictures and biometric identification challenges are to be transacted between the user and the destined application server. Such credentials can only safe guarded if and if such communication takes place through a hack resistant private secured communication link. The challenge generation means includes first means (not shown in figures) adapted to generate the first factor challenge to be offered to users. The first factor challenge is typically in the form of pictures, i.e. the user who has logged onto the system 100 is challenged to identify his/her PID (picture identifier). Typically, during the phase of registering with the system 100, the user would be asked to select at least one picture ID that would subsequently used to authenticate the user. During the phase of authentication, the user is provided with a set of pictures, the picture set including the picture ID that was previously selected by him/her. The user is prompted to identify his/her picture ID from the set of pictures and based on the picture ID selected by the user, he/she would be authenticated. Alternatively, the first factor challenge could be in the form of a captcha. In such a case the user is prompted to look at the captcha and input the contents of the captcha to the authentication engine 18 to prove his/her identity. Alternatively, the first factor challenge can also be in the form of bio matrix challenge, i.e. the user can be asked to prove his/her identity by providing corresponding unique biometric credentials. Alternatively, the first factor challenges can also include pre generated random numbers. The random numbers are generated using conventional random number generating systems and transmitted to the user's requesting communication gadget. The user is prompted to input the received random number sequence onto authentication engine 18 in order to ascertain his/her identity. The first factor challenge is displayed on the pre-registered requesting communication gadget associated with the user. By accepting and answering the first factor challenge the user authenticates the server and gets a confirmation to the effect that he/she is indeed communicating with the system 100.

Subsequent to the display of first factor challenge on the requesting communication gadget associated with the user, the challenge generation means 18A makes use of second means (not shown in figures) to generate the second factor challenge. The second factor challenge is typically in the form of limited duration one time password (OTP). The OTPs, in accordance with the present disclosure includes one of the elements selected from the group consisting of sequence of alphabets, sequence of numerals and sequence of alphanumeric characters The limited duration one time password is displayed on the pre-registered requesting communication gadget associated with the user. The OTP is utilized to appropriately recognize the user who has logged onto the system 100 subsequent to completion of the first factor challenge. The OTPs provided as the second factor challenge are session based, i.e. they are valid only for the corresponding communication session and expire after a pre-determined amount of time. Further to the generation of first factor challenge and second factor challenge, the challenge generation means 18A makes uses of third means (not shown in figures) which is adapted to optionally generate a third factor challenge. The third factor challenge offered to the users is typically in the form of a simple algebraic equation, typically a one-time equation (OTE). For example, the algebraic equation could be in the form 'Ax+By +C=D'; and the user is prompted to make use of the values associated with the variables x, y and C to compute the value of D. The values of variables x, y and C are typically provided to the user on his/her pre-registered, requesting communication gadget. The user is prompted to compute the value of OTE and input the computed value of the OTE to the authentication engine 18 as a part of response to the third factor challenge. In accordance with the present disclosure, the way the user chooses the relevant picture ID from a group of pictures and the way the user answers the one-time equation helps in obtaining the behavioral trace corresponding to the user. The behavioral trace of the user is determined based on whether he/she chooses the correct picture ID and calculates the appropriate value, typically by using longhand method, corresponding to the OTE.

In accordance with the present disclosure, the first factor challenge offered to the users via challenge generation means 18A is transmitted onto the browsers of the pre-registered requesting communication gadgets associated with the users, typically in the form of cookies. As soon as the user successfully completes the first factor challenge, the second factor challenge is transmitted onto the browser of the requesting communication gadget associated with the user in the form of cookies. For the purpose of verification, challenges in the form of cookies transmitted to the requesting communication gadget associated with the user are simultaneously transmitted through SDH/SONET based private data frames and also in the form of cookies, to the application server to which the user seeks access. The one time password and the optional one time equation transmitted to the requesting communication gadget associated with the user are encrypted using either Advanced Encryption Standard (AES) or Linear Feedback Shift Register (LFSR). Additionally, quantum cryptography techniques can also be utilized for quantum key generation and quantum key management to ensure unconditional safety to the data being transmitted. Subsequently the one time password keyed-in by the user and the values corresponding to the variables contained in one time equation are also transmitted back to the authentication engine 18 from the requesting communication gadget associated with the user in an encrypted format. The data communication between the authentication engine 18 and the application server which the user desires to access takes place in the form of Synchronous Optical Network (SONET)/Synchronous Digital Hierarchy (SDH) based private data frames. The SONET/SDH frames with application specific synchronization patterns which may not comply with the published ITU (International Telecommunication Union) standards. Further several dynamic frame sequence processes can be put in place to make the frames hacker resistant. Hence, every frame is cryptographically secured with dynamic key management and new framing engineering.

The challenge generation means 18A, in accordance with the present disclosure is further adapted to perform look-ahead multi-tier cookie management. The first factor challenge in the form of OTP can be generated using a pseudo random generator. The value generated by the pseudo random number generator can be used as a value corresponding to the OTP to be provided to the users. Similarly, the optional OTE provided to the user as third factor challenge is also in the form of cookies. Post successful authentication of the user based on the multiple factor challenges, cookies are removed from the web browser of user's requesting communication gadgets so that no footprint corresponding to the cookies remains in user's requesting communication gadgets.

In accordance with the present disclosure, the challenge generation means 18A cooperates with a picture generation means (not shown in figures) which is adapted to offer the user a picture when he/she logs onto the system 100 using a desktop computer or a laptop computer. The picture is displayed to the user in order to assure the user that he/she is inputting the OTP/OTE to the authorized system and not to an impostor or to a hacker.

The authentication engine 18, in accordance with the present disclosure includes verifying means 18B which verifies the identity associated with the user based on the responses (responses to the first factor challenge, the second factor challenge and the optional third factor challenge). If the verifying means 18B, based on the responses provided by the user determines that the user has successfully answered both the first factor challenge and the second factor challenge, then it subsequently ascertains the credentials corresponding to the application server for which the user is seeking access based on at least the Symmetric Key Infrastructure based key and the Public Key Infrastructure based digital certificates. Subsequent to the authentication of the user as well as the application server to which the user requested access, the linking means 18C of the communication engine 18 connects the requesting communication gadget associated with the client to the application server using the out-of-band, private bandwidth provided by the hybrid telecommunication means 16.

In accordance with the present disclosure, the authentication engine 18 communicates with the user through the private out of band telecommunication network which can be in the form of:
  wire line internet media: this is typically utilized for communication between the system 100 and a user using either a desktop computer or laptop computer; and
  wireless communication network: the communication medium offered to the user is a wireless network in the event that the user is using his/her mobile phone to access and log onto the system 100.

The rationale behind offering multiple modes of communication is to make sure that a hacker or an adversary will not be able to ascertain the mode of communication being used by the user to communicate with the system 100.

In accordance with the present disclosure, the system 100 is adapted to manage the data communication between the authentication engine 18 and the application servers. The data communication between the authentication engine 18 and the corresponding application server is session based. The system 100 makes sure that the communication between the authentication engine 18 and the corresponding application server takes place through authenticated and encrypted communication tunnels.

In accordance with the present disclosure, subsequent to verifying the credentials of the application server the user had requested access to, the authentication engine 18 logs the user onto the application server corresponding to which he/she had raised an access request. A communication session is subsequently established using the out-of-band, private bandwidth provided by the hybrid telecommunication means 16 and between the requesting communication gadgets associated with the user and the application server which the user had requested to access.

In accordance with the present disclosure, the system 100 can communicate with the corresponding application server using one or more proxy systems. In the event that the application server which needs to be accessed is remotely located, the system 100 is adapted to communicate with such remotely located application server using one or more proxies which are connected to the system 100 through wireless/wired, secured, and private communication network. It is also desirable that the proxy system that is located at a geographic location close to that to the application server could be hardwired for example, using optical fiber cables to the system 100. By adapting such an infrastructure, the system 100 of the present disclosure eliminates the need for remotely located application servers to be hardwired to the system 100.

Referring to FIG. 2A, there is shown a block diagram depicting the connectivity between the authentication engine 18 and the application server 20 associated with providers of sensitive services. Referring to FIG. 2A, the application server 20 and the authentication engine 18 form a part of the Virtual Enterprise Network (VEN). The application server 20 associated with provider of sensitive services could be a banking server or an enterprise data warehouse or a point of sale terminal from where monetary transactions take place or a server facilitating e-commerce. However it is possible that the application server 20 performs any other activity specified by providers of sensitive services. The authentication engine 18 identifies an application server 20 based on the private name (not the name allotted to the application server on the DNS) associated with the application server 20. The data is exchanged between the application server 20 and authentication engine 18 in the form of SONET/SDH based data frames. The data frames thus exchanged are encrypted using encryption standards selected from the group of encryption standards consisting of Public Key Infrastructure (PKI), Advanced Encryption Standard (AES) and Diffie-Hellman algorithm. The authentication engine 18, for the purpose of verification and for the purpose of authenticating the credentials associated with the application server, initiates exchange of Symmetric Key Infrastructure (SKI) based key on a daily basis. The key is exchanged on a daily basis in order to enable the authentication engine 18 to appropriately verify the identity of the application server 20. Further, the data, i.e. the first factor challenge, second factor challenge and the optional third factor challenge sent from the authentication engine 18 to the user's requesting communication gadget is typically encrypted using encryption schemes selected from the group of schemes consisting of Linear Feedback Shift Register (LFSR), Public Key Infrastructure (PKI) and the Diffie-Hellman algorithm. Subsequently, the data sent back from the user's requesting communication gadget to the authentication engine 18 is also encrypted using any of the aforementioned encryption schemes. The authentication engine 18 typically communicates with the application server 20 through a secured communication tunnel which is session based and which utilizes the out-of-band, private bandwidth provided by the hybrid telecommunication means 16.

Referring to FIG. 2B, there is provided a pictorial representation of the manner in which the system 100 of the present disclosure provides users with secured access to application servers. According to FIG. 2B, a first user makes use of the mobile phone to access an application server registered with the system 100. The wired communication line which is typically an Asymmetric Digital Symmetric Line (ADSL) is connected through an edge router to a switching means 10. Unlike the setup seen in FIG. 1, in case of FIG. 2, users connect to a switch 10 instead of establishing a direct connection with the application server corresponding to provider of sensitive services. The switching means 10 is connected to a mobile service switching center from where the access request generated by the user is transmitted to the switching means 10. After receiving the request from the user, the switch transfers the user request from the conventional ADSL based communication network to a private, out of band communication network/link. Subsequently, a private, out of band communication network/link is established via the switch 10, between the mobile phone associated with the user and the authentication engine 18. The authentication engine 18 subsequently authenticates the user by offering multi-factor challenges, namely the first factor challenge, the second factor challenge and the optional third factor challenge. Based on the response provided by the user to the multi-factor challenges, the authentication engine 18 selectively establishes a out-of-band, private communication link between the requesting communication gadget associated with the user (mobile phone in this case) and the application server. In FIG. 2B the hybrid telecommunication network is shown to be provided by 'Operator C'. Users connect to the application servers associated with providers of sensitive services using this hybrid telecommunication network. According to FIG. 2B, the application server is a server associated with a bank. Subsequent to the establishment of the fiber optic link, the rest of the communication takes place through the newly established fiber optic link rather than the conventional ADSL link.

Referring to FIG. 2C, there is shown the back end application corresponding to the system 100. The system 100, as explained earlier allows multiple users to access requests to application servers using multiple communication gadgets such as mobile phones, laptop computers and desktop computers. The system 100 includes a hybrid telecommunication means (not shown) and switching means (hybrid switch) 10 and a framer 12. Application servers in case of this particular figure are the servers associated with banking organizations. The requests from multiple users are routed to the system 100 via conventional telecommunication networks and subsequent to the routing of the requests to the system 100 the user is switched over from the conventional communication network to a private, out-of-band telecommunication network. The switching means 10 is able to handover the user communication from wireline network, wireless network and the GPRS/3G based mobile communication network. Such a transfer from the conventional telecommunication network such as wireline/wireless/GPRS/3G network takes place via the switching means 10. The system 100 further includes an SDH framer which transfers data in the form of data packets and between the system 100 and application servers. The system 100 also includes a firewall located between the system 100 and application servers in order to block any unauthorized access to the application server. Application servers are connected to the system 100 over a peer-to-peer network.

Referring to FIG. 3, there is shown the flow of data across the system envisaged by the present disclosure. As shown in FIG. 3, users from diversified geographical locations connect to the system of the present disclosure. The 'L2' switch associated with the system enables multiple number of users to simultaneously log onto the system. Subsequently, the L2 switch segregates the users as per their requirements and provides them with access to the authentication engine of the present disclosure which offers multi factor identification (MFI) challenges to the users. The answers provided by users to multi factor identification challenges are fed to a framer which is connected through a passive optical network (PON). The framer is adapted to receive the data corresponding to the multi factor identification challenges accomplished by the user and if multi factor identification turns out to be successful, then the user is automatically provided access to the requested application server which typically can also be a bank server. The connection between the framer and the application server is also through a passive optical network.

Referring to FIGS. 4A and 4B, there is shown a flow chart describing the steps involved in the computer implemented method for providing users with access to application servers in a secured manner. The method, in accordance with the present disclosure includes the following steps:

receiving at least one request from a requesting communication gadget associated with a user, wherein the request corresponds to a request to access at least one application server 200;

tracing the location of the requesting communication gadget and tracing the type of communication channel utilized by requesting communication gadget to transmit the request 201;

allocating out-of-band, private communication bandwidth to the requesting communication gadget and establishing an out-of band, private communication link with the requesting communication gadget 202;

utilizing the out-of-band, private communication bandwidth to transmit multi-factor challenges including first factor challenge, second factor challenge and third factor challenge, to the requesting communication gadget 203;

verifying the user associated with the requesting communication gadget based on said user's response to at least one of said multi-factor challenges, and verifying authenticity of the application server requested access to by the user, based on at least digital certificates associated with the application server 204; and using the private, out of band communication bandwidth to establish a private, out-of-band communication link between said requesting communication gadget and the application server only in the event that the user and the application server are successfully verified 205.

In accordance with the present disclosure, the step of establishing an out-of band, private communication link with the requesting communication gadget further includes the step of automatically switching the requesting communication gadget onto the private, out-of-band communication link.

In accordance with the present disclosure, the step of utilizing the out-of-band, private communication bandwidth to transmit multi-factor challenges further includes the following steps:

generating a first factor challenge which includes an identifier selected from the group of identifiers consisting of picture identifiers, captchas and biometric identifiers;

generating a second factor challenge in the form of a limited duration one-time password, wherein the one-time password includes elements selected form the group of elements consisting of sequence of alphabets, sequence of numerals and sequence of alphanumeric characters; and optionally generating a third factor challenge in the form of a limited duration one-time equation.

In accordance with the present disclosure, the step of using the private, out of band communication bandwidth to establish a private, out-of-band communication link to the requesting communication gadget further includes the step of initiating an SSL (Secured Socket Layer) handshake with the requesting communication gadget.

In accordance with the present disclosure, the step of using the private, out of band communication bandwidth to establish a private, out-of-band communication link further includes the step of automatically terminating the private, out-of-band communication link on completion of communication between the requesting communication gadget and the application server.

Referring to FIG. 5, there is shown a flow diagram depicting the manner in which the system 100 of the present disclosure offers private, secured, wireless bandwidth to users wishing to log-on to the application servers. As seen in FIG. 5 users use their mobile device/personal computer to log on to the corresponding e-banking application, which in turn enables them to access the application servers associated with, for example, 'BANK A' and 'BANK B'. In contrary to the prior art systems depicted in FIGS. 1A and 1B, the data call from the user's mobile phone/personal computer is handed over to the hybrid telecommunication engine which provides private, secured wireless bandwidth to the user via a "hybrid tower". The data call is handed over from the Mobile Switching Center (MSC) to the hybrid telecommunication means. All the data calls are aggregated at the hybrid telecommunication engine and transferred on a private WAN via the private, secured, wireless bandwidth to an authentication engine which offers a first factor challenge (in the form of picture identifiers/captchas/biometric identifiers), a second factor challenge (in the form of limited duration one time password) and a third factor challenge (limited duration one time equation) over the private, secured, wireless bandwidth to authenticate the user. Subsequent to successful authentication, the data call from the user's mobile phone/personal computer is forwarded to the corresponding application server (in this case application servers of Bank A and Bank B respectively).

Technical Advancements

The technical advancements system and method envisaged by the present disclosure include the following:

present disclosure provides users with safe and hacker resistant private & secured communication channel for linking with application servers;

present disclosure provides a single window solution for communication between all the available mobile service providers of sensitive services and their respective users;

present disclosure provides a system that ensures that the level of security made available to all providers of sensitive services and their respective users is uniform in nature;

present disclosure provides a system that ensures that at least the user is duly authenticated (he is who he is) before the commencement of a transaction;

present disclosure provides a system that ensures that users as well as application servers associated with providers of sensitive services are authenticated before the commencement of transactions;

present disclosure provides a system that makes use of multiple communication techniques to ensure that transactions performed through the system are hacker resistant;

present disclosure makes available a system that offers 'out of band' and private mode of communication between application servers associated with providers of sensitive services and their respective users;

present disclosure provides a system that makes use of 'multi-factor challenge' mechanism to appropriately identify/authenticate the user;

present disclosure provides a system that offers easy retrofit in terms of deployment;

present disclosure provides a system that leaves zero foot print despite the system being accessed from non-secured web environments including cyber cafes, Wi-Fi zones and the like;

present disclosure makes available a system which provides user with access to application servers associated with providers of sensitive services only after the user has authenticated himself/herself with the system;

present disclosure provides a system that makes use of 'geo location tracing' techniques to identify the location of the user trying to access the system;

present disclosure makes available a system that provides user with common credentials corresponding to multiple providers of sensitive services;

present disclosure provides a system that is highly scalable, robust and cost efficient;

present disclosure offers a system that is resistant to future kill switches because of the utilization of private bandwidth;

present disclosure offers a system that authenticates users using challenges based authentication;

present disclosure offers a system that provides internet anonymity to the users by offering point to point connectivity in internet maze and by providing identity credentials based on multi factor identification of users; and present disclosure offers a system that resists cyber war elements and cyber conflicts by ensuring that a hacker will not have any information corresponding to the private, out of band communication between an application server and the respective user.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer implemented system for providing users with secured access to application servers, said system comprising: a communication engine communicating with a set of communication gadgets, said communication engine configured to receive at least one request via an in-band communication channel from a requesting communication gadget associated with a user, wherein said request corresponds to a request to access an application server; a hybrid telecommunicator cooperating with said communication engine, said hybrid telecommunicator adapted to establish a session-based, out-of-band, private communication link between the requesting communication gadget and an authentication engine and allocate session-based, out-of-band, private communication bandwidth to the requesting communication gadget, wherein a type of said session-based, out-of-band, private communication link is determined based on a type of the channel, said authentication engine comprising: a challenge generator adapted to utilize said session-based, out-of-band, private communication bandwidth to transmit multi-factor challenges provided in the form of cookies including a first factor challenge, a second factor challenge and a third factor challenge to the requesting communication gadget; a verifier adapted to verify an identity of the user associated with the requesting communication gadget based on said user's response to at least one of said multi-factor challenges and remove the cookies post successful verification of the requesting communication gadget, said verifier further adapted to verify authenticity of said application server requested access to by said user based on at least digital certificates associated with said application server; a linker adapted to use said session-based, out-of-band, private communication bandwidth to establish a secure, out-of-band, private communication link between the requesting communication gadget and said application server in the event that said user and said application server are successfully verified by said verifier; and a switch adapted to automatically switch the requesting communication gadget onto said secure, out-of-band, private communication link wherein said automatic switching is performed based on a type of the channel.

2. The computer implemented system as claimed in claim 1, wherein said authentication engine includes a repository adapted to store at least one of a plurality of random numbers, a plurality of picture identifiers, a plurality of captchas, unique biometric credentials corresponding to the users, a plurality of alphanumeric characters and a plurality of equations.

3. The computer implemented system as claimed in claim 1, wherein said challenge generator includes a limited duration factor challenge generator cooperating with a repository of said authentication engine and adapted to generate a third factor challenge in the form of a limited duration one-time equation.

4. The computer implemented system as claimed in claim 1, wherein said session-based out-of-band, private communication bandwidth is allotted through said session-based out-of-band, private communication link selected from the group consisting of a private wired communication link, a private wireless communication link and a private GPRS based network connection.

5. The computer implemented system as claimed in claim 1, wherein said system further includes a terminator adapted to automatically terminate said secure, out-of-band, private communication link on completion of communication between the requesting communication gadget and the application server requested access to by said user.

6. A computer implemented method for providing users with secured access to application servers, said method including the following steps: receiving at least one request via an in-band communication channel from a requesting communication gadget associated with a user, wherein said request corresponds to a request to access at least one application server; tracing a location of the requesting communication gadget and tracing a type of the communication channel utilized by the requesting communication gadget to transmit said request; allocating session-based, out-of-band, private communication bandwidth to the requesting communication gadget and establishing a session-based, out-of-band, private communication link with the requesting communication gadget, wherein the allocating further comprises: utilizing said session-based, out-of-band, private communication bandwidth to transmit multi-factor challenges provided in the form of cookies including first factor challenge, second factor challenge and third factor challenge to the requesting communication gadget; verifying the user associated with the requesting communication gadget based on said a user's response to at least one of said multi-factor challenges, and verifying authenticity of the application server requested access to by said user, based on at least digital certificates associated with said application server and removing the cookies post successful verification of the requesting communication gadget and the application server; and establishing a secure, out-of-band, private communication link between the requesting communication gadget and said application server only in the event that said user and said application server are successfully verified and upon verification, automatically switching the requesting communication gadget onto said secure, out-of-band, private communication link wherein said automatic switching is performed based on a type of the channel.

7. The computer implemented method as claimed in claim 6, wherein the step of establishing said, session-based out-of-band, private communication link with the requesting communication gadget further includes the step of initiating an SSL (Secured Socket Layer) handshake with the requesting communication gadget.

8. The computer implemented method as claimed in claim 6, wherein the step of establishing said, secure, out-of-band, private communication link with the requesting communication gadget further includes the step of automatically terminating said secure, out-of-band, private communication link on completion of communication between the requesting communication gadget and the application server.

* * * * *